United States Patent Office 2,711,868
Patented June 28, 1955

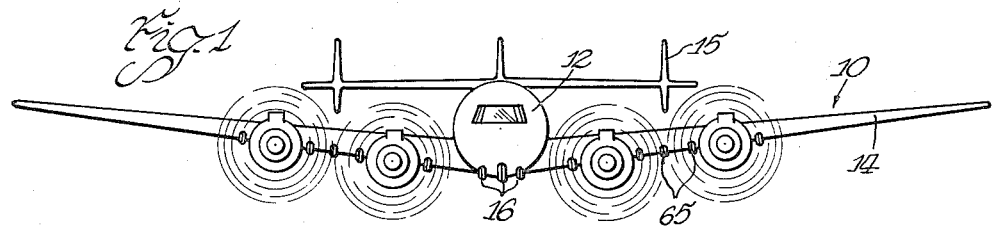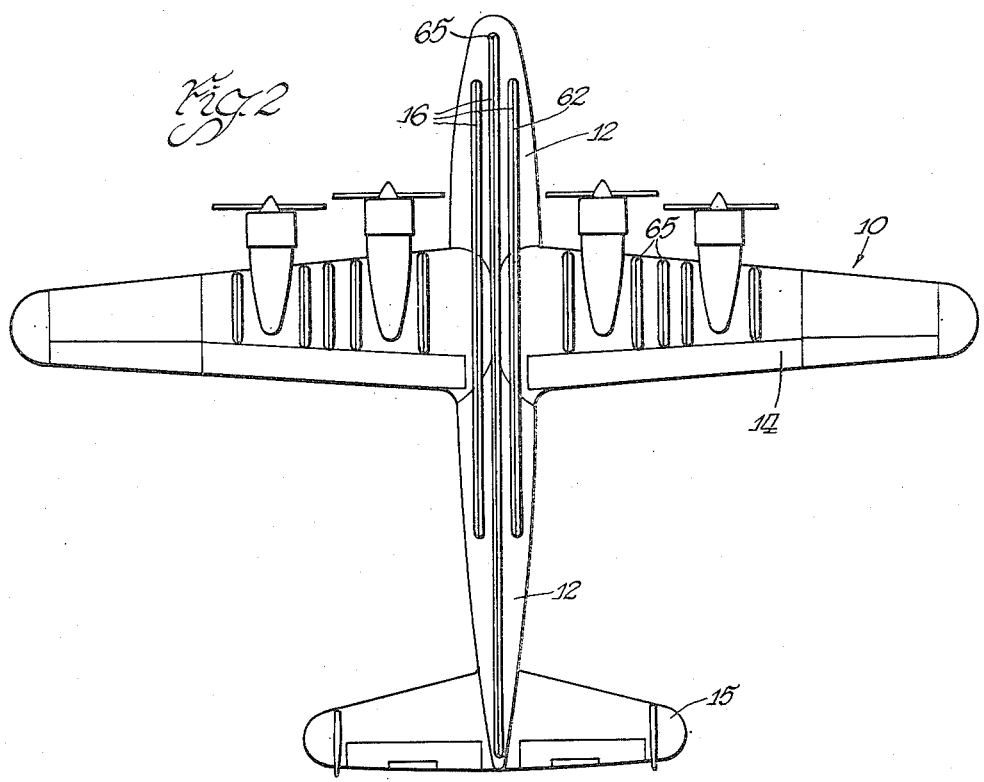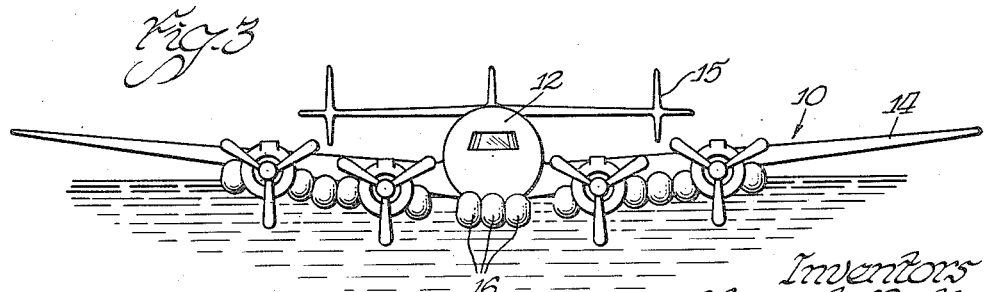

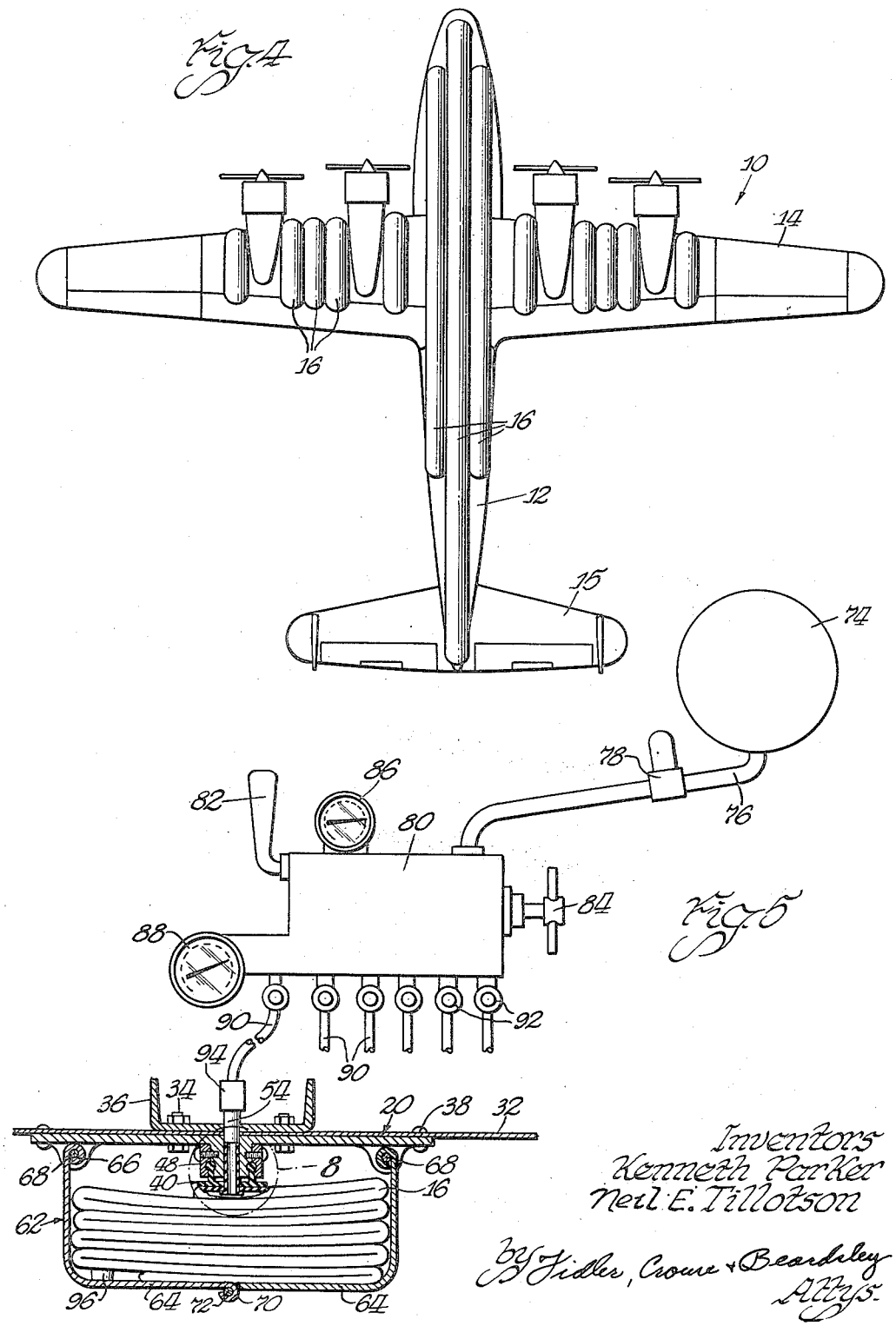

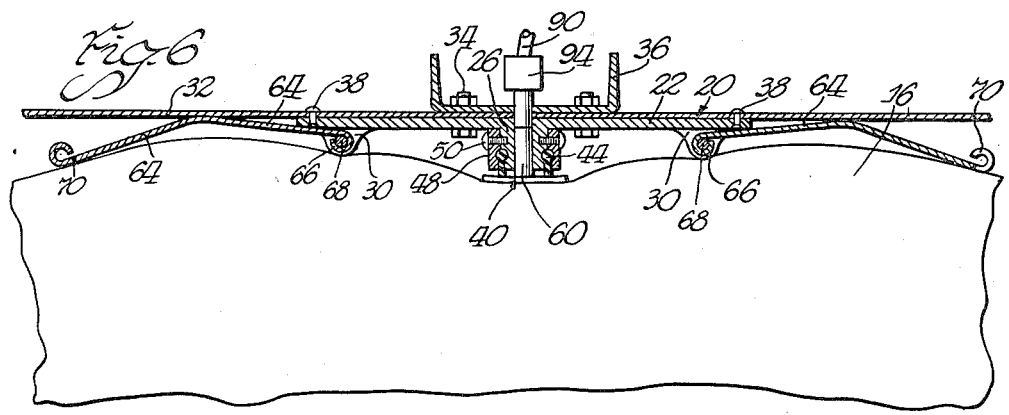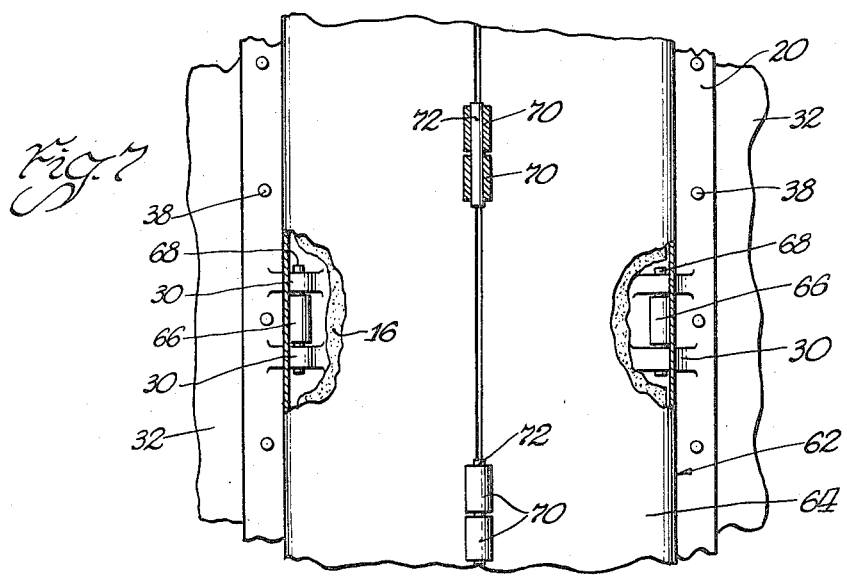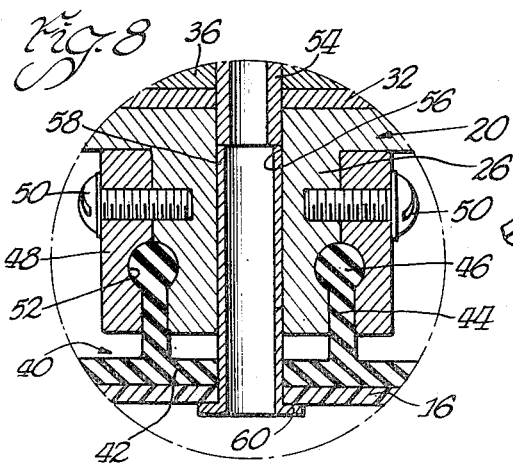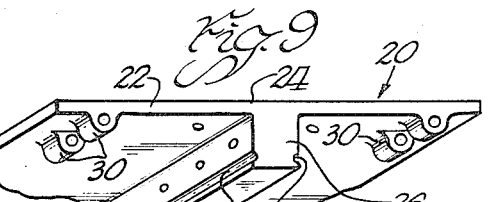

2,711,868

FLOTATION DEVICE FOR AIRCRAFT

Kenneth Parker, Janesville, Wis., and Neil E. Tillotson, Wellesley Hills, Mass.

Application October 25, 1952, Serial No. 316,826

8 Claims. (Cl. 244—107)

This invention relates to flotation devices for aircraft and has to do particularly with devices for maintaining such craft afloat on the surface of a body of water even though any buoyancy inherent in the craft in its original condition may be diminished or entirely destroyed.

An object of the invention is to provide an improved flotation device of the foregoing character.

Another object is to provide a flotation device which maintains the aircraft afloat on the surface of the water with a substantial portion of the aircraft above the surface of the water.

A further object is to provide a flotation device of the foregoing character which can be readily applied to existing aircraft with a minimum of modification of the aircraft.

A still further object is to provide a flotation device for aircraft adapted for application to the exterior of existing aircraft and which is of such structure that it does not substantially reduce the aerodynamic efficiency of the aircraft.

Another object is to provide a flotation device for aircraft which is capable of supporting the aircraft on the surface of water with a high degree of stability.

A more specific object is to provide a flotation device for aircraft, which is of such construction that it can be attached to the under surface of the aircraft with portions thereof distributed over a large portion of that surface, whereby the total buoyancy of the device is relatively great, the aircraft is supported with a high degree of stability, and substantial buoyancy is assured in the event that parts of the aircraft are damaged or even broken away from the remainder of the aircraft.

Still another object is to provide a flotation device for aircraft adapted for securement to the outer surface of the aircraft, and including inflatable floats normally deflated and contained in a housing, in which the housing is of relatively small dimensions so as to offer minimum resistance to air flow and the floats are inflatable to relatively large size so as to provide sufficient buoyancy to maintain the aircraft afloat even though any buoyancy inherent in the aircraft in its original condition be diminished or entirely destroyed.

A further object is to provide a flotation device of the foregoing character which includes inflatable floats normally in deflated condition and contained in a housing, in which the housing is opened and the floats are automatically expelled from the housing in response to inflation of the floats.

Another object is to provide a flotation device of the foregoing character which includes inflatable floats normally deflated and contained in a housing, in which novel means is utilized for normally retaining the housing closed, in the form of a frangible securing element that is destroyed by the pressure of the floats against the housing in the operation of inflating the floats, and the housing is thereby released for opening movement.

Other objects and advantages of the invention will be apparent upon reference to the following detail description taken in conjunction with the accompanying drawings, in which—

Figure 1 is a front view of an aircraft to which the flotation device of the present invention is applied, showing the floats somewhat diagrammatically, deflated and enclosed;

Fig. 2 is a bottom view of the aircraft of Figure 1;

Fig. 3 is a front view of the aircraft of Figure 1 showing the floats somewhat diagrammatically, inflated and expelled from the enclosing housing means;

Fig. 4 is a bottom view of the aircraft of Figure 3;

Fig. 5 is a somewhat schematic view, partially in section, showing one of the floats when deflated and folded, the mounting bracket and housing therefor, and the means for inflating the float;

Fig. 6 is an enlarged, fragmentary sectional view showing a portion of a float and the mounting bracket and housing therefor, with the float in inflated condition and expelled from the housing;

Fig. 7 is a bottom view of a portion of a housing and the support therefor, representing the accompanying float as being deflated and enclosed in the housing, portions being shown broken away and in section;

Fig. 8 is an enlarged fragmentary detail view of the portion enclosed in the dot-dash line 8 of Fig. 5; and Fig. 9 is a fragmentary perspective view of a portion of the mounting bracket for a float.

Figs. 1 to 4 illustrate one type of aircraft to which the flotation device of the present invention is adaptable although it will, of course, be understood that the device can be applied to any of a wide variety of aircraft. The aircraft 10 includes the usual fuselage 12, wings 14, and tail assembly 15.

The flotation device is especially adapted to application to existing craft, and there is no necessity for including in the original design of the craft any provision specially for enabling application of the device to the craft. Aircraft already in service and not provided with effective flotation means for use in emergencies can be provided with the flotation device of the present invention with the same effectiveness as if it were incorporated in the craft in the original construction thereof. To the end of so applying the device to aircraft, the device includes inflatable floats secured to the outer surface of the craft and a supply of inflating fluid and controls within the craft. Incorporation of the device in an existing aircraft hence can be made readily and easily and at a minimum of expense.

In consideration of the desirability that the aerodynamic characteristics of the aircraft not be materially affected, and the fact that the floats are positioned on the exterior surface of the craft as referred to above, the floats are arranged in fore and aft direction so as to offer the least possible resistance to air flow. Moreover, the floats are confined, normally and when not in use, within a space having minimum dimensions transverse to the direction of air flow. In order that the floats can be so contained in a minimum space and yet have buoyancy sufficient for the purpose, they are of flexible, inflatable character, so that when they are not in use they can be deflated and folded in the desired minimum space, and when inflated, they possess substantial volume for providing the requisite buoyancy. For the purpose of further minimizing resistance to air flow, housing means is provided for enclosing the deflated floats, having closed rounded ends and an overall smooth outer surface. The housing means not only presents a smooth surface to the flow of air, but retains the deflated floats in a space of minimum dimensions.

In the event that an aircraft makes an emergency landing on water, the craft should be floated so that a maximum portion of the craft is supported above the surface of the water, in the interest of the safety of occupants and cargo. The most effective way to accomplish this fact is to locate the floats on the under surface of the craft. The present flotation device is so constructed as to enable the desired positioning of the floats on the under surface. Such arrangement of the floats is facilitated by the construction of the floats and their mounting means which enables their securement to the exterior surface of the craft, since the craft presents an under surface adaptable to positioning of the floats thereon and securement thereto.

It is further desired that when an aircraft alights on water it be floated in as stable a manner as possible so as to prevent possible capsizing and otherwise minimize possible damage to the craft. To this end the floats are distributed throughout a substantial portion of the under surface of the craft, in position where all of them engage the water when the craft is in upright position, with some of the floats, if necessary, being entirely immersed. The wide distribution of floats has a further advantage in the fact that if any portion of the craft should be broken away, the remaining portion will be kept afloat, the different floats being separate units and independently inflated.

The flotation device includes a plurality of floats 16 (Figs. 3 and 4), each a complete unit separate from the others and each independently mounted on the craft, as well as being independently controllable as to inflation. The floats, mounted on the under surface of the craft, extend longitudinally of the craft in the direction of the air flow, i. e., in fore and aft direction. The floats are located on the fuselage and wings in covering or underlying relation to the greater portion of the surface thereof, the individual floats extending substantially the full longitudinal extent of the usable surface at their particular locations.

Each float 16 is in the form of a flexible, inflatable balloon-like bag or sack preferably substantially cylindrical when in inflated condition, with hemispherical end surfaces. The material of which the floats are made is of sufficient strength to prevent rupture under the inflating pressures employed, as well as of sufficient flexibility to permit folding. The floats are of course impervious to water, and gases utilized for inflating purposes, and possess sufficient resistance to salt water and gasoline, and preferably also to oil and grease. While any of a number of materials may be utilized for the floats, polyvinyl chloride is preferable as having the desired characteristics mentioned above. Among the various fluids that may be used for inflating the floats, carbon dioxide has been found highly satisfactory, it is not excessively heavy, it has a low boiling point, it has no toxic effects under the proposed conditions of use, it is not inflammable, and it offers no serious difficulties to being liquefied and stored.

To the end that the floats may be readily and easily attached to an existing aircraft, and with a minimum of modification of the craft, mounting means for the floats and their housings is provided which is fitted to the outer surface of the craft and secured in such position. The mounting means, as shown in Figs. 5 to 9, includes a mounting bracket 20 of suitable material such, for example, as aluminum, which provides the desired strength while at the same time it is relatively light in keeping with the desired conditions in this respect in the case of aircraft. The mounting bracket 20 is preferably a machined piece of extruded aluminum, having a width as represented horizontally in Fig. 9 and a length substantially equal to that of the individual float to be mounted thereon, which in the case of the center float as represented in Figs. 2 and 4, may be substantially the full length of the craft in fore and aft direction. The bracket includes a plate-like element 22 having an upper surface 24 suitably shaped and adapted for engagement throughout its area directly with the exterior surface of the craft in securing the bracket on the craft.

Extending downwardly from the under surface of the plate-like element 22 is a rib 26 extending the full length of the bracket for securing the float thereon. The rib 26 may be of small transverse dimension relative to the plate element 22 and adjacent its lower edge on each side thereof is a groove 28 running throughout the full length thereof. Also on the under surface of the plate, preferably integral therewith, are longitudinally spaced pairs of downwardly extending lugs 30 having aligned apertures for receiving hinge pins of the housing utilized for enclosing the deflated floats.

The bracket 20 is applied to the skin 32 of the craft with the surface 24 fully engaging the surface of the skin. The mounting bracket is then secured in such position in a suitable manner such, for instance, as by bolts 34 inserted through openings in the element 22, skin 32 and structural frame member 36 of the craft, and suitable nuts for the bolts. Also, if desired, the element 22 may be riveted to the skin along its longitudinal edges as at 38. The structural frame member 36 of course constitutes the main means for supporting the bracket, while the rivets 38 aid in retaining it in position. The mounting brackets may thus be secured to the craft with a minimum of modification of the craft, the only modification of the structure of the craft required being the provision of holes for the bolts 34 and rivets 38.

The float 16 is mounted on and secured to the mounting means 20 in a simple and effective manner. The means for so mounting the float 16 includes an anchoring member 40 preferably of suitable rubber or plastic which extends substantially the full length of the mounting bracket 20 and the float. The member 20 includes a base portion 42 and a pair of laterally spaced longitudinally extending ribs 44 having rounded beads 46 at their free edges. The base portion 42 is fitted to the surface of the float and secured thereto in a suitable manner as, for example, by a known welding process. The beads 46 are fitted in the grooves 28 on the opposite sides of the rib 26 and held therein by means of longitudinally extending strips 48, the latter being secured to the rib 26 by suitable means such as screws 50. The strips 48 are provided with grooves 52 in register with and cooperating with the grooves 28 for receiving the beads 46 and retaining the latter in the cooperating grooves when the strips 48 are fitted tight against the side surfaces of the rib 26. The lower portions of the strips 48 may firmly engage the rib portions 44, aiding further in retaining the member 40 in position.

Each mounting bracket includes conduit means for flow of inflating fluid into the float mounted thereon from a supply source to be described later. Such conduit means includes a section 54 leading through the structural frame member 36, the skin 32 of the craft, and a bore 56 in the rib 26. A second conduit section 58 forming a continuation of the section 54 is fitted in the bore 56 with its outer end extended through apertures in the anchoring member 40 and the wall of the float 16 where a flange 60 on the section engages the inner surface of the wall of the float. The conduit section 58 is of course appropriately sealed with the wall of the float, the anchoring member 40 and the bore 56 by any suitable means, against the escape of gas. Similarly, the conduit section 54 is sealed in the bore 56.

It is desired that the floats be inflatable to as large a volume as practicable so as to provide maximum buoyancy for maintaining the craft afloat on the surface of water. It is also desirable that when the floats are not in use, that they be deflated and that they occupy a space having minimum dimensions in directions transverse to the air flow. It is further desirable that the floats be contained within a housing having a smooth outer surface and being otherwise of such character as to offer a minimum resistance to air flow. In the latter consideration, the ends of the housing provided for enclosing the float are closed and have rounded outer surfaces. It is furthermore desirable that when it is desired that the floats are to be inflated, that the floats be expelled out of the housings with facility and rapidity. The present invention embodies housing means for the floats so constructed as to have all of the advantages above referred to.

The housing 62 includes a pair of housing members 64, generally concave in shape and together forming a shell-like housing enclosing the deflated float. Each of the housing members 62 in the present instance is generally L shaped in cross section although other specific shapes may be utilized so long as they are effective for enclosing the deflated float and when opened, enable the float to be expelled therefrom in response to inflation of the float. The housing members have rounded end closure elements which when the members are closed form rounded and smooth ends 65 (Figs. 1 and 2). Each of the housing members 64 includes hinge elements 66 cooperable with the lugs 30 on the mounting bracket 20 and hingedly mounted thereon by means of suitable pins 68 fitted in the hinge elements and lugs. The lugs 30 and hinge elements may be spaced longitudinally at desired intervals as needed for proper support of the housing elements and hence, partial support of the enclosed deflated float. The opposite edges of the housing members 64 meet or substantially meet along the longitudinal center line where they are secured together for normally retaining the housing members in closed position.

When the floats are to be inflated, as when the craft alights on water, it is desired that they be inflated and expelled from the enclosing housing with the greatest facility possible. To this end, the means for securing the housing members in closed position includes a frangible element that is sheared or broken in response to the expanding pressure of the float when the latter is inflated. The meeting edges of the housing members 64 are provided with suitable loop elements 70 spaced at intervals longitudinally of the housing. Inserted in the loop elements 70 are pins 72 formed of frangible material enabling them to be sheared when sufficient pressure is applied to the housing members 64 in response to inflation of the float 18. The particular material of which the pins 72 are formed is not critical as long as the pins shear in response to the pressure of inflation of the float. It is therefore not necessary for the operator or pilot of the craft to perform any operation specially for opening the housing members. He need only perform the operation necessary for inflating the floats, and the latter automatically open the housings in response to their inflation.

In order that the floats, when inflated, have as much freedom as possible to spread in all directions either due to the normal inflation thereof by the gas therein or by distortion by pressures exerted by engagement with the water, the housing members 64 are of relatively bendable material so as to yield under the action of the floats. Aluminum has been found satisfactory for this purpose and will yield or bend under the influence of the inflating pressure of the floats. In addition to possessing the capability of so bending under the desired pressure, aluminum has the additional quality of the desired strength necessary for containing and supporting the floats when the housing members are connected together in enclosing relation to the floats, as well as lightness desirable in aircraft. In Fig. 6 the relation of the parts illustrates the action of the floats in bending or otherwise distorting the housing members. When the craft alights on the surface of water, the weight of the craft and the upward force of the water tend to flatten the floats so that their vertical dimension is less than their transverse horizontal dimension, with the result that the upper side portions of the floats tend to bulge upward toward the adjacent portions of the craft. As shown in Fig. 6, the upper portions of the float extend laterally from the anchoring member 40 and slightly upwardly into engagement with the adjacent portions of the mounting bracket 20 and housing members 64 and the latter, in engaging the skin 32 of the craft, are bent or deformed toward flattened condition by the action of the pressure of the float against the housing members. The floats engage the under surface of the craft (through the housing members 64) throughout a considerable transverse area, greatly diminishing the tendency of the floats to be rolled or displaced laterally. The main forces exerted on the floats are vertical, with lesser forces exerted in other directions such as may be due to bobbing or lateral shifting of the craft on the water. The floats when inflated expand laterally a considerable extent, and those that are close to each other interengage (Figs. 3 and 4) so that the latter floats are further stabilized by the fact that any forces in transverse directions on any of the floats are resisted by adjacent floats.

The means for containing the fluid for the floats under pressure and the means for controlling its flow into the floats when inflation of the latter is desired, is shown diagrammatically in Fig. 5. The fluid, which is preferably carbon dioxide, is contained under pressure in a tank 74 mounted in any convenient location within the interior of the craft such as in a compartment in the fuselage. The particular location, of course, may be as desired with conduits leading through appropriate controls to the different floats. The tank 74 is preferably spherical so as to provide greatest strength possible for containing the fluid under the intense pressure required. For example, the fluid, when contained in the tank 74, may be under pressure of approximately 1000 p. s. i. From the tank 74 leads a conduit 76 in which is interposed a filter 78 which may be of any well known type desired for removing foreign material, including moisture, from the fluid and for preventing the passage thereof into the instruments utilized for controlling the flow of the fluid. A conventional instrument 80 including a shut-off valve and pressure regulator of suitable and well known construction is employed for controlling the flow of the fluid from the tank 74 to the floats. The pressure regulator included in the instrument reduces the pressure of the fluid in its flow from the supply tank to the floats, from 1000 p. s. i. to approximately 5 p. s. i., at which pressure the fluid is in gaseous form. The latter pressure has been found adequate for inflating the floats to the extent necessary for providing sufficient buoyancy even when they are completely submerged to a considerable depth (Fig. 3) which in the case of a large airplane may be ten feet or more. If it is found that multiple stages are required for reducing the pressure of the fluid from the supply tank to the floats, such may be provided by appropriate regulators of known type.

The instrument 80 includes means for manipulating the valve in the instrument which may be in the form of a handle 82, and another control member 84 for adjusting the pressure regulator so as to deliver the fluid to the floats at the desired pressure. The instrument 80 may also be provided with a suitable high pressure gauge 86 on the high side of the instrument and a low pressure gauge 88 on the low side. Conduits 90 lead from the valve and pressure regulator 80 to the various floats, individually connecting with the conduit sections 54 referred to above and fitted in the mounting brackets 20. Preferably the conduits 90 are provided with manual shut-off safety valves 92 of well known and approved type, as well as one-way valves 94 which also are of well known type. Furthermore, each individual float proper 18 is provided with a conventional safety valve 96.

When the operator or pilot of the craft alights on the water and desires then to inflate the floats, he should of course be enabled to so inflate them as quickly and easily as possible. For this purpose the valve and pressure regulator 80 together with the valves and control members 82 and 92 are located adjacent the pilot's station. He can therefore immediately operate the valves to inflate the floats with a minimum loss of time after the craft alights. With the instrument 80 disposed adjacent the other controls of the craft, the pilot merely operates the control element 82 and the valves 92 as well as the control element 84 if any manipulation of the latter is required. The fluid from the tank then flows through the instrument 80 and through the valves 92 and conduits 90 to the respective floats. After it is found that the floats are fully inflated the pilot merely shuts off the valve by manipulating the control handle 82. If desired, each of the large floats may be provided with a plurality of filling openings, with associated conduits, in order to fill them more rapidly.

The one-way valves 94, as will be understood, permit the flow of fluid therethrough into the floats but not in the opposite direction and accordingly, gas will not be lost from a float after that float is inflated or partially inflated in the event that any accident may befall the remainder of the system. The safety valve 96 on each float enables the escape of excess gas from the float if the float should inadvertently become overinflated, avoiding breaking or splitting of the float. If any one float should develop a leak or explode, its gas line or conduit can be shut off by means of the respective manual shut-off valve 92 so that the gas from the remainder of the system is not lost through the damaged float.

It may be desired on occasion to inflate the floats more rapidly than can be done in the manner described above, such, for instance, as in the event that the craft alights on water and there is danger of immediate submersion of the craft. In that event it would be desired to inflate the floats much more rapidly than would normally be the case when the fluid flows through the instrument 80. To that end it is contemplated that provision be made for by-passing the instrument 80 for enabling the fluid to flow directly from the tank 74 into the conduits 90. Appropriate by-pass conduit means may be employed for interconnecting the conduit 76 with the conduits 90, with valve means providing for changing the course of the fluid alternatively through such conduit means and the conduit 76. The operator may introduce fluid into the floats in such rapid manner until the floats are nearly full, and when the floats approach complete inflation, the operator can then direct the fluid through the instrument 80 so as to more accurately control the final stages of inflation to prevent over-inflation.

The thickness of the walls of the floats 18 is such that the floats possess the desired strength for containing gas under the desired pressure, namely, approximately 5 p. s. i., which has been found desirable. With gas in the floats under such pressure, the total buoyancy of all of the floats, as arranged according to the present invention, is sufficient to provide complete buoyancy for the craft if the buoyancy inherent in the craft as originally constructed should be diminished or completely destroyed. On the under surface of the fuselage the floats extend a substantial portion of the length of the fuselage and one of them, the center one, extends substantially the full length thereof. Moreover, the floats on the wing provide additional buoyancy, adding to the total buoyancy of the flotation means as well as providing stability to the craft in that the laterally placed floats on the wing aid in preventing sidewise rocking of the craft. Furthermore, relatively wide distribution of the floats provides buoyancy at a great number of locations on the craft so that if, for example, any portion of the craft should be broken away, the remaining portion would be provided with relatively widely distributed floats and in sufficient number and capacity to float such remaining portion of the craft.

The construction of the flotation device which enables its securement to the under surface of the craft, enables the floats to be positioned at any locations on such under surface, within wide limits, and hence in underlying relation to substantial portions of the fuselage, whereby the floats on the fuselage, which extend a substantial portion of the length thereof, provide maximum buoyancy. This feature is of further importance when considering that in many, if not most types of craft, the fuselage, when the craft is floating on water, engages the water throughout a substantial area. Advantage is taken of this fact in placing the floats on the fuselage and utilizing as great an expanse of surface of the craft as possible for locating the floats and thereby providing maximum buoyancy.

In the case of the particular kind of craft illustrated herein, the wing portions incline upwardly and outwardly, and due to the weight of the craft, those floats that are on the lowermost portion of the under surface of the craft may be completely submerged in the water, while those in relatively elevated positions may be only partially submerged, as illustrated in Fig. 3. The relatively large portion of the floats that are secured to the fuselage and, as in the present case, completely submerged, as well as the floats that are nearly completely submerged, constitute a relatively large portion of the total flotation means. Those floats that are disposed outermost on the wing are relatively short and the fact that these are not fully submerged detracts only a minor amount from the total buoyancy.

The floats, when deflated and enclosed within the housings, offer relatively little resistance to air flow. The housings 62 extend longitudinally fore and aft of the craft, i. e., in the direction of the air flow; their outer surfaces are smooth and they are relatively small in transverse dimensions; moreover, their ends are closed and provided with rounded surfaces, all to the end of minimizing resistance to air flow. However, when the floats are inflated, they expand to relatively great dimensions for providing maximum buoyancy. As an example of the relative dimensions of the floats and their housings, floats approximately 3' in diameter can be contained in housings such as 62, which are approximately 9" x 6.25" in transverse dimensions. Preferably the floats are folded as in Fig. 5 when enclosed in the housings 62. The cylindrical portions of the floats, when the floats are deflated, will fold in even and regular folds. However, the end portions of the floats, which are hemispherical in shape when inflated, contain more material per unit area, when deflated, than the cylindrical portions. Consequently, the end portions, which form the hemispherical ends, occupy, when the float is deflated and folded, greater space in cross-sectional dimensions than the cylindrical portions. For the purpose of appropriately containing such end portions in the housings 62, the adjacent portions of the fuselage and wing can be provided with pockets or recesses for receiving the end portions of the floats so that the portions of the housings 62 covering the end portions need be of no greater transverse dimensions than the remaining portions of the housings.

The flotation device of the present invention is capable of application to an existing aircraft without substantial modification of the aircraft. Such modification of the aircraft does not entail any basic redesign of the craft. In order to mount the floats on the craft, it is necessary only to provide holes for the bolts, rivets and conduits, and pockets for the end portions of the floats. The supply tank and the controls are mounted in the interior of the craft, and essentially the only change required in the interior of the craft is the provision of openings for the conduits.

We claim:

1. The combination with an aircraft of a plurality of generally parallel, inflatable but normally deflated, individual flotation members, each flotation member being relatively long and narrow, mounting means separate from the structure of the aircraft supporting each of said flotation members, each mounting member being substantially equal in length to the respective flotation member and equal in width to the deflated flotation member, the mounting means being fitted to the under surface of the aircraft and secured to the structural members of the aircraft with the flotation members extending in fore and aft directions along the craft, and means for inflating said flotation members.

2. The combination with an aircraft of a plurality of generally parallel, inflatable but normally deflated flotation members, each flotation member being relatively long and narrow, mounting means for supporting each of said flotation members including a member having an upper surface of substantial area engageable with the exterior surface of the aircraft and means on its under surface supporting the flotation member, the mounting members being secured to the under surface of the aircraft with the flotation members extending in fore and aft directions along the craft, and means for inflating said flotation members.

3. The combination with an aircraft of a plurality of generally parallel, inflatable but normally deflated, elongate flotation members, mounting means for supporting each of said flotation members including a member having an upper surface engageable with the exterior surface of the aircraft and means on its under surface supporting the flotation member, said last means being of relatively small transverse dimension extending substantially throughout the length of the mounting member and engaging and being secured to the flotation member at substantially all points throughout the length of the latter, the mounting members being secured to the under surface of the aircraft with the flotation members spaced apart laterally and extending in fore and aft directions along the craft, and means for inflating said flotation members.

4. The combination with an aircraft having a fuselage and wing of a plurality of inflatable, but normally deflated flotation members secured to the under exterior surface of the fuselage and wing of the aircraft, said flotation members being long and narrow and being arranged in fore and aft directions, those flotation members secured to the fuselage extending longitudinally throughout a substantial portion of the length thereof and at least one of them extending substantially throughout the entire length, and the flotation members on the wing being distributed throughout a substantial portion of the wingspread on both sides of the fuselage and spaced apart transversely with substantial spaces between adjacent ones thereof, and means for inflating said flotation members.

5. The combination with an aircraft of an inflatable flotation member attached to the under side of said aircraft, means for inflating said flotation member, and means for enclosing said flotation members in deflated condition comprising a pair of generally concave closure members hingedly connected to the under side of said aircraft for movement between open and closed positions and formed of a material which is sufficiently rigid to maintain its shape when said members are in closed position but capable of being deformed between the under side of said aircraft and said flotation member when the latter is inflated, and means releasable by inflation of said flotation member for retaining said closure members in closed position.

6. The combination with an aircraft of a plurality of relatively closely spaced, generally parallel, inflatable but normally deflated, elongate flotation members, mounting means for each of said flotation members including a member of substantially the length of the flotation member and having an upper surface engageable with the exterior surface of the craft, means on the under surface of the mounting member extending substantially the length of the mounting member and supportingly engaging the flotation member substantially throughout the length of the latter, the mounting members being secured to the under surface of the fuselage and wing of the craft positioning the flotation members in fore and aft direction along the craft, housing means for each flotation member including a pair of concave members hingedly mounted on said mounting member on opposite sides of the flotation member, said housing members being swingable to closed position enclosing the flotation member when the latter is deflated, and to open position enabling inflation of the flotation member, means securing the housing members in closed position frangible in response to inflation of the flotation member, said housing members being forced against the surface of the craft and bendable under the influence of inflation of the flotation member toward flattened condition adjacent the surface of the craft, and the housing members having closed ends with rounded surfaces, and means for inflating the flotation members.

7. The combination with an aircraft having a fuselage and wing of a plurality of inflatable, but normally deflated flotation members secured to the under exterior surface of the fuselage and wing, the flotation members being distributed throughout a substantial portion of said surface of the aircraft and each having a length equal to the greater portion of the fore and aft dimension of the aircraft at the position it assumes thereon, each flotation member being normally confined in smooth surface housing means with spaces between adjacent ones thereof, and the flotation members being expellable from the housing means and when inflated at least certain ones of adjacent members substantially abutting in transverse directions, and means for inflating said flotation members.

8. The combination with an aircraft having a fuselage and wing and in which the under surface of the fuselage and wing forms a smooth continuous mergence without abrupt changes in direction, of a plurality of inflatable but normally deflated flotation members secured to said under surface, said flotation members when deflated being relatively long and narrow and extending in fore and aft directions, said flotation members also being spaced apart laterally with substantial space between adjacent ones, and being distributed throughout a substantial portion of said under surface and each extending substantially the greater portion of the longitudinal dimension of the craft at its position thereon, whereby when the craft is floated on water the said under surface is submerged in gradual increments and the flotation members are submerged in correspondingly gradual increments, and means for inflating said flotation members.

References Cited in the file of this patent

UNITED STATES PATENTS

| | | |
|---|---|---|
| 1,011,683 | Webb | Dec. 12, 1911 |
| 1,293,918 | Priolo | Feb. 11, 1919 |
| 1,312,355 | Reid | Aug. 5, 1919 |
| 1,489,619 | Tsavaris | Apr. 8, 1924 |
| 1,573,465 | Von Waldy | Feb. 16, 1926 |
| 1,748,492 | Mikula | Feb. 25, 1930 |
| 1,866,451 | Carden | July 5, 1932 |
| 2,264,321 | Manson | Dec. 2, 1941 |
| 2,444,264 | Morris | June 29, 1948 |
| 2,463,351 | Bowers | Mar. 1, 1949 |

FOREIGN PATENTS

| | | |
|---|---|---|
| 718,206 | Germany | Mar. 5, 1942 |
| 941,135 | France | June 28, 1948 |